(No Model.)
W. F. SMITH & W. W. ADAMS.
COTTON GIN BREAST.
No. 306,035. Patented Sept. 30, 1884.
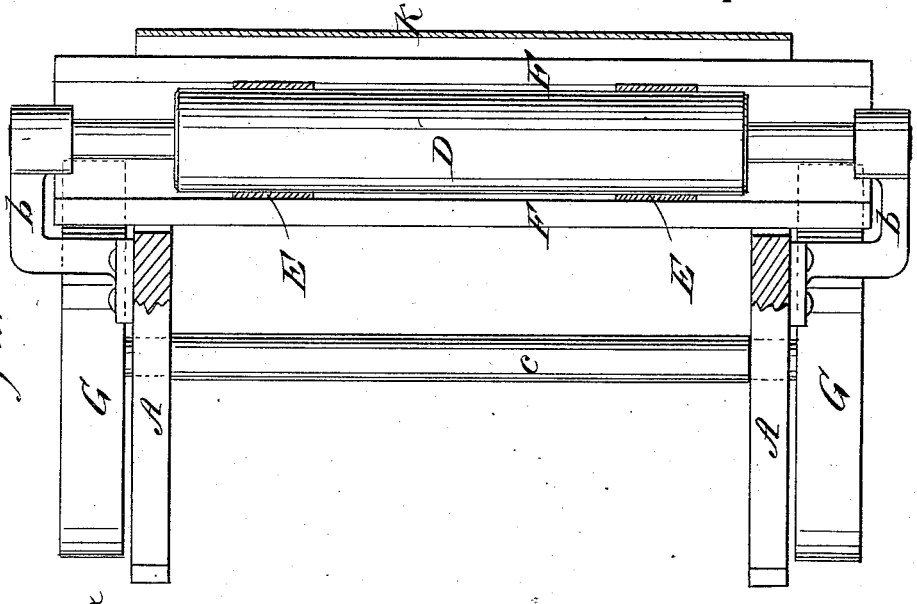
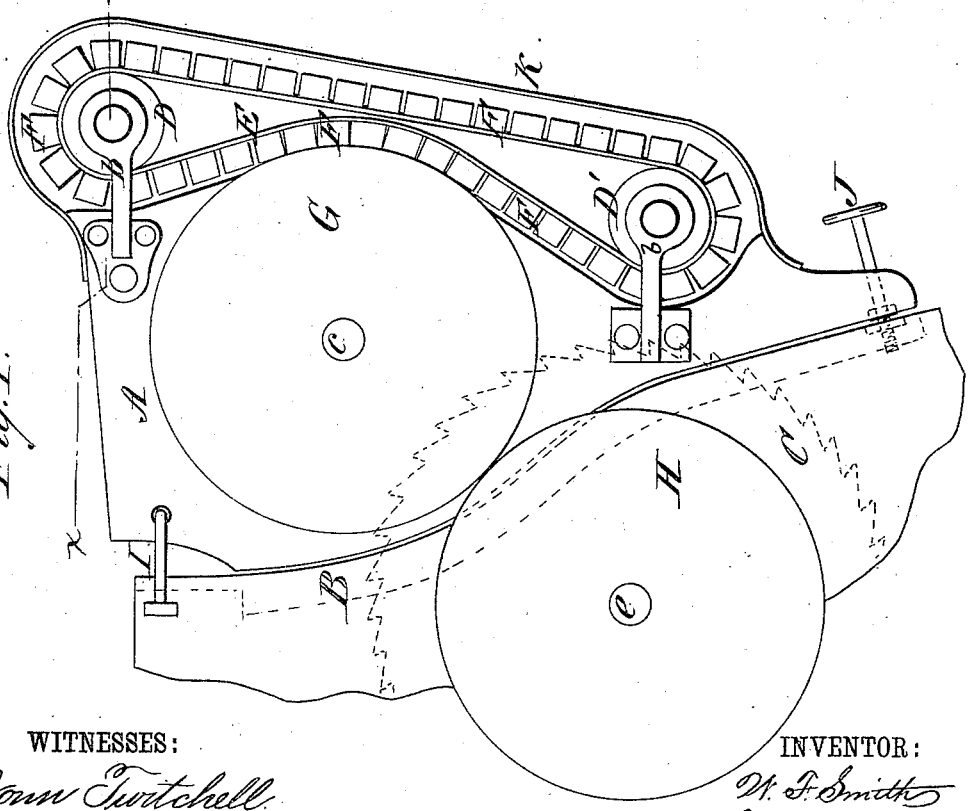
WITNESSES:
Donn Twitchell
C. Sedgwick
INVENTOR:
W. F. Smith
W. W. Adams
BY Munn & Co.
ATTORNEYS.

UNITED STATES PATENT OFFICE.

WILLIAM F. SMITH AND WILLIAM W. ADAMS, OF OZARK, ARKANSAS; SAID SMITH ASSIGNOR TO SAID ADAMS.

COTTON-GIN BREAST.

SPECIFICATION forming part of Letters Patent No. 306,035, dated September 30, 1884.

Application filed March 8, 1884. (No model.)

*To all whom it may concern:*

Be it known that we, WILLIAM F. SMITH and WILLIAM W. ADAMS, of Ozark, in the county of Franklin and State of Arkansas, have invented certain new and useful Improvements in Cotton-Gin Breasts, of which the following is a full, clear, and exact description.

This invention pertains to improvements in cotton-gin breasts, having for its objects to facilitate the passage of the cotton to the saws, to prevent the breaking or stopping of the roll, and to afford increased facility for ginning wet cotton; and the invention consists of the combinations of parts, substantially as hereinafter fully set forth, and pointed out in the claims.

Reference is to be had to the accompanying drawings, forming a part of this specification, in which similar letters of reference indicate corresponding parts in both the figures.

Figure 1 represents an end view of a cotton-gin breast in part embodying our invention, and Fig. 2 a partly sectional plan on the line $x$ $x$ in Fig. 1.

A A indicate the ends or heads of the breast; B, one of the ribs of the gin, and C one of the saws.

D D' are a pair of upper and lower rollers that extend from one end or head A to the other, and which have journals and bearings in brackets $b$ $b$, attached to the outside of the heads.

E E are belts arranged to pass around the rollers D D', and armed or faced externally with strips F, of wood or other suitable material, in parallel relation with each other, arranged not only to connect the belts to which they are riveted, but to extend beyond them and beyond the heads A A, the belts E E being placed sufficiently near each other to keep the strips F uniform.

Upon a shaft, $c$, arranged to pass through both heads A A, are secured, outside of said heads, two wheels, G G, made to bear against and deflect or press outward between the axes of the upper and lower rollers D D' the inner portions of the strip-armed belts E E, said wheels acting as idlers to drive said belts or flexible breast-back, which they form by their action on or against the protruding ends of the strips F. Upon the ends of the saw-shaft $e$ are two other wheels, H, that serve to drive by friction the wheels G G, which in their turn operate the flexible breast-back E E F. The wheels G G might be used as anti-friction heads, if desired, by arranging them within the heads A A, instead of on the outside thereof.

I are hook-bolts that fasten the heads A A at or near their top to the frame-work that the gin-ribs B are secured to, and J is an adjusting-bolt that passes through the lower end of each head A, and is provided with a collar and with a screw-thread fitting a suitable nut or metal strip, for the purpose of regulating the frictional contact of the rollers G, that drive the flexible breast-back.

K is a sheet-metal guard extending from head to head to inclose the flexible breast-back, and secured above and below to the heads.

Having thus described our invention, we claim as new and desire to secure by Letters Patent—

1. The combination, in a breast for cotton-gins, of a suitably-supported flexible breast-back comprising one or more belts armed with strips upon the exterior side or sides, and driving-wheels encompassed by said belt or belts, and disposed at such distance apart as to present an intermediate yielding and outwardly-flexed surface to the roll of cotton, substantially as and for the purpose set forth.

2. The combination, with the heads A A of the breast, of the upper and lower rollers D D', the belts E E, the parallel strips F, connecting said belts, and the friction driving-wheels G, arranged outside of the heads A A, for operation on said strips to drive and deflect the belts, essentially as shown and described.

WILLIAM F. SMITH.
WILLIAM W. ADAMS.

Witnesses:
THOMAS C. MOORE,
H. B. EVANS.